(12) United States Patent
Karri et al.

(10) Patent No.: US 12,431,972 B2
(45) Date of Patent: Sep. 30, 2025

(54) DYNAMICALLY RESTORING Li-Fi COMMUNICATION

(71) Applicant: INTERNATIONAL BUSINESS MACHINES CORPORATION, Armonk, NY (US)

(72) Inventors: Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 17/592,833

(22) Filed: Feb. 4, 2022

(65) Prior Publication Data
US 2023/0254038 A1    Aug. 10, 2023

(51) Int. Cl.
*H04B 10/11*    (2013.01)

(52) U.S. Cl.
CPC .................................. *H04B 10/11* (2013.01)

(58) Field of Classification Search
None
See application file for complete search history.

(56) References Cited

U.S. PATENT DOCUMENTS

| | | | |
|---|---|---|---|
| 10,187,146 B2 | 1/2019 | Tilaye | |
| 2018/0083701 A1* | 3/2018 | Tilaye | H04B 10/116 |
| 2019/0261239 A1 | 8/2019 | Wang | |
| 2021/0075509 A1* | 3/2021 | Draaijer | H04B 10/118 |
| 2021/0184820 A1 | 6/2021 | Mondal | |

FOREIGN PATENT DOCUMENTS

| | | |
|---|---|---|
| CN | 107040946 B | 7/2020 |
| CN | 112436855 A | 3/2021 |
| CN | 112865862 A | 5/2021 |
| FR | 3048550 A1 | 9/2017 |
| FR | 3075520 A1 | 6/2019 |
| KR | 1020190082421 A | 7/2019 |

OTHER PUBLICATIONS

"LiFi Misconceptions", LiFi.co, downloaded from the internet on Jan. 10, 2022, 7 pages, <https://lifi.co/lifi-misconceptions/>.

(Continued)

*Primary Examiner* — David W Lambert
(74) *Attorney, Agent, or Firm* — Monchai Chuaychoo

(57) ABSTRACT

An approach for dynamically restoring light-based network communication (e.g., Li-Fi, etc.) between Li-Fi devices is disclosed. The approach includes identifying environmental situation such as location of Li-Fi devices, automaton robotics with moving parts, determining risk of obstacles by simulating (via machine learning) one or more scenarios that could potentially be created by moving parts. The approach selects the optimal scenario and based on the selected scenario, the approach executes the scenario. The executed action can include optimizing the light path of the Li-Fi devices by instructing moving parts to follow a new path or leverage a new light path created by secondary Li-Fi device and/or mirror assembly to ensure no interruption to the Li-Fi network.

20 Claims, 6 Drawing Sheets

(56) References Cited

OTHER PUBLICATIONS

"LiFi", MaxLinear, downloaded from the internet on Jan. 10, 2022, 2 pages, <https://www.maxlinear.com/solutions/industrial-multi-market/lifi>.

Abumarshoud et al., "LiFi Through Reconfigurable Intelligent Surfaces: A New Frontier for 6G?", arXiv:2104.02390v3 [cs.IT], Apr. 21, 2021, 9 pages.

Deepika et al., "Applicability of LiFi Technology for Industrial Automation System", International Research Journal of Engineering and Technology (IRJET), vol. 05 Issue 02, Feb. 2018, pp. 259-262.

Isik et al., "Applicability of Li-Fi Technology for Industrial Automation Systems", International Journal of Electronics and Electrical Engineering vol. 5, No. 1, Feb. 2017, pp. 21-25.

Noack, Alexander, "Li-Fi Brings New Life to Industrial Data Transmission", Electronic Design, Feb. 23, 2018, 9 pages, <https://www.electronicdesign.com/industrial-automation/article/21806175/lifi-brings-new-life-to-industrial-data-transmission>.

Won et al., "Ambient LED Light Noise Reduction Using Adaptive Differential Equalization in Li-Fi Wireless Link", Sensors 2021, 21, 1060, 17 pages.

\* cited by examiner

DYNAMICALLY RESTORING Li-Fi COMMUNICATION

BACKGROUND

The present invention relates generally to the field of electronic communication, and more particularly to dynamically restoring Li-Fi communication.

Li-Fi communication utilizes light instead of radio frequency (Wi-Fi) to transmit/receive data in a digital network. Li-Fi communication network has an advantage over Wi-Fi communication in environments (e.g., certain manufacturing, aircraft, hospitals, etc.) that must minimize radio frequency interference. For example, in an industrial floor, there are robotic equipment and moving autonomous vehicles, that must communicate with each other without interference from other manufacturing machines/devices. Thus, Li-Fi system provides a radio frequency-less (i.e., no interference) and reliable data transfer rate than existing radio-frequency based network (i.e., Wi-Fi) in such setting as the industrial floor.

SUMMARY

Aspects of the present invention disclose a computer-implemented method, a computer system and computer program product for dynamically restoring Li-Fi communication between Li-Fi devices. The computer implemented method may be implemented by one or more computer processors and may include, identifying environmental situation, determining one or more obstacles based on the environmental situation, simulating one or more scenarios based on the one or more obstacles, selecting an optimal scenario from the one or more scenarios and executing the optimal scenario.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
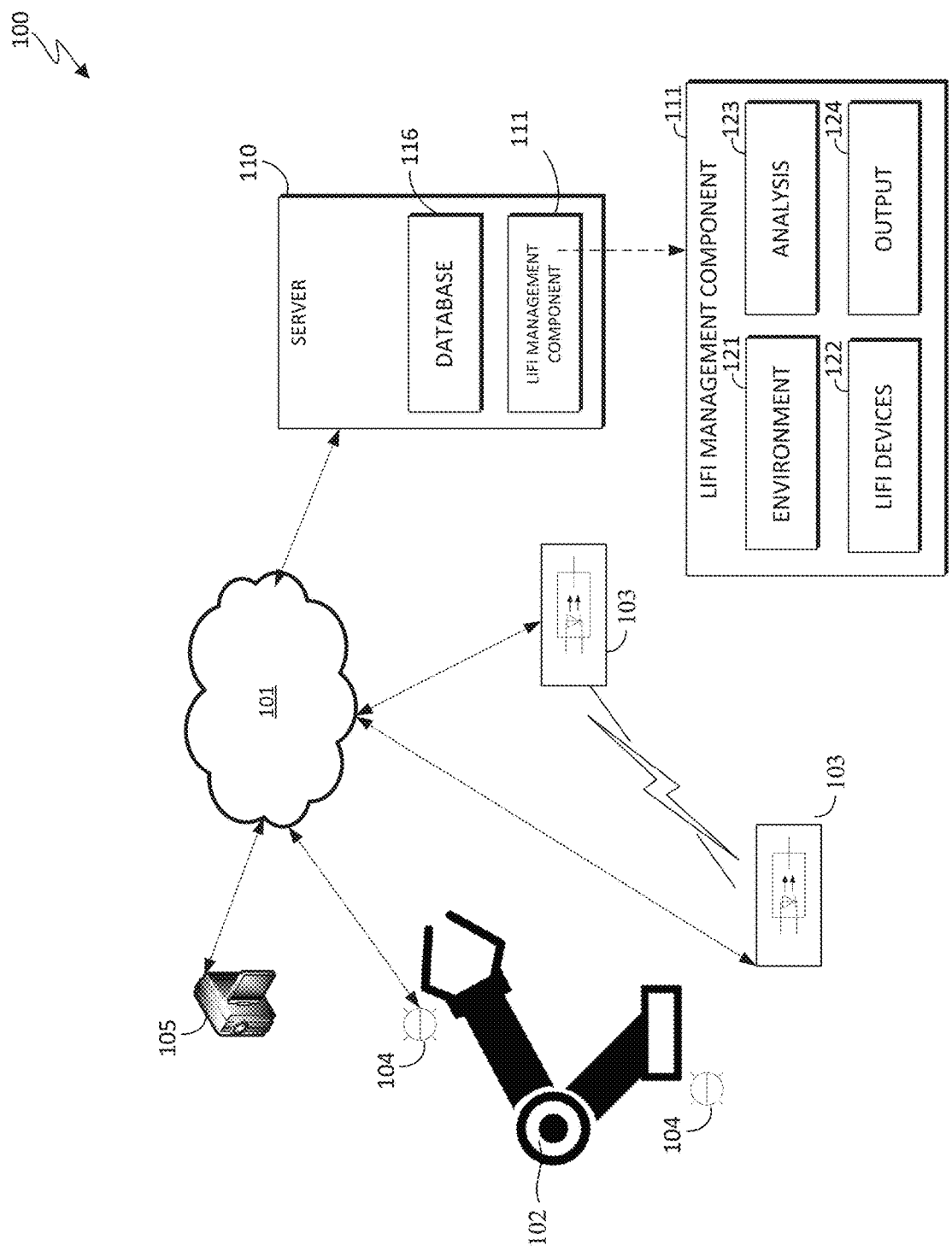
FIG. 1 is a functional block diagram illustrating a Li-Fi management environment, designated as 100, in accordance with an embodiment of the present invention.

The current state of art as it pertains managing Li-Fi communication, can present some challenges. One challenge, for example, in a manufacturing environment, robotic arms used in assembly (i.e., movement) may interfere with the line-of-sight communication required in Li-Fi.

Embodiments of the present invention recognizes the deficiencies in the current state of art as it relates to an interruption (e.g., obstacle, shadows, etc.) to light-based communication by providing a dynamic approach to restoring the interrupted communication. For example, in an industrial automation environment, robotic assembly (e.g., robotic arms, materials transport, etc.) may interrupt a light-based network based on their movement (i.e., blocking the line of sight required for light communication with their arms during assembly of a product). The approach can proactively restore light-based communication (e.g., Li-Fi, etc.) by simulating future movements (via machine learning) and determine certain required movements that could block the light-based communication. Based on prediction of the future movements, multiple rotating/flexible mirrors (located at various points of the arm of the robot) can be instructed to create a new light path by reflect the light beam around the robot to another base receiver/transmitter (either primary receiver or secondary receive/transmitter).

Other embodiments may analyze robotic arm movements and can proactively (via machine learning) identify visible light obstruction associated with Li-Fi communication and the approach can proactively ensure that no light obstacle (i.e., shadow point) is hindering network communication by instructing the robotic arm to move in a different manner but still able to achieve the tasks assigned (e.g., assembling a part, moving a part, etc.).

Other embodiments may utilize synchronizing movements of multiple robots in an area that uses light-based communication. The embodiment may analyze the dimensions, positions of different robotic system, types of activities and the mobilities required to be performed. Furthermore, the embodiment can perform end-to-end simulation of the robotic movements and can recommend how the obstacles (to visual light communication) can be prevented. For example the approach could determine locations for, i) mirror to reflect Li-Fi for a new path or ii) location along the robotic system body to install additional the Li-Fi transmitter/received module for a new light path around the multiple robots.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating Li-Fi management environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Li-Fi management environment 100 includes network 101, interactive devices 102, primary Li-Fi device 103, secondary Li-Fi devices 104 and IoT devices 105.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, interactive devices 102, primary Li-Fi device 103 and other computing devices (not shown) within Li-Fi management environment 100. It is noted that other computing devices can include, but is not limited to, interactive device 102 and any electromechanical devices capable of carrying out a series of computing instructions.

Interactive devices 102 are one or more electro-mechanical devices that are capable of performing various physical tasks based on a set of instructions (i.e., computer programs). The physical tasks can comprise of, but is not limited to, moving materials from one location to another, welding metallic parts, painting and assembling items.

In other embodiments, interactive devices 102 can comprise of entertainment devices such as VR (virtual reality) and AR (augmented reality) headsets and/or controllers that may not have moving parts but nevertheless are used by consumers for fun, such as in playing video games or simulators.

Primary Li-Fi devices 103 are the primary communication devices in a light-based network, typically larger and powerful, used as transmitter and/or as receiver. They are capable of sending/receiving data within a light-based communication network.

Secondary Li-Fi devices 104 are typically smaller devices for communication within a light-based network. This may include mirror assemblies that can rotate in 3D space (i.e., six degrees of freedom). The motorized mirrors can be instructed to tilt in a certain orientation to reflect a light signal from primary Li-FI devices 103 and create a new light path should the existing path between primary Li-Fi devices 103 or secondary Li-FI device 104 becomes obstructed. It is noted that secondary Li-Fi devices does not have to reside on robotic assembly or other moving objects, it can be stationary.

In another embodiment, secondary Li-Fi devices 104 can consist of smaller and less powerful transmitter and/or receiver used within a light-based communication network.

IoT devices 105 can include sensory devices (e.g., cameras, microphone, motion sensors, infrared sensors, etc.) that can record physical characteristics such as, but it is not limited to, visual information, temperature, humidity, sound, and movement. For example, IoT device 105 can be smart cameras used to observe, identify and/or monitoring potential/existing obstacles between primary Li-Fi device 103, interactive device 102 or secondary Li-Fi device 104.

Embodiment of the present invention can reside on server 110. Server 110 includes Li-Fi management component 111 and database 116.

Li-Fi management component 111 provides the capability of, but it is not limited to, i) dynamically restoring light-based communication after an interruption and/or ii) coordinating automaton assembly devices (i.e., interactive devices 102) to perform its goal/tasks without interruption to a light-based communication.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any other programmable electronic device capable of communicating other computing devices (not shown) within Li-Fi management environment 100 via network 101. In another embodiment, server 110 represents a computing system utilizing clustered computers and components (e.g., database server computers, application server computers, etc.) that act as a single pool of seamless resources when accessed within Li-Fi management environment 100.

Database 116 is a repository for data used by Li-Fi management component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within Li-Fi management environment 100, provided that Li-Fi management component 111 has access to database 116. Database 116 may store information associated with, but is not limited to, knowledge corpus of historical movements of interactive device 102, save scenarios of various simulations associated with interactive device 102, datasets (e.g., initial, test, etc.) used train the machine learning algorithm, instructions on how to employ/direct secondary Li-Fi devices 104, knowledge corpus of detail specifications of all observable devices (e.g., 102, 103, 104, 105) within an area, knowledge corpus of users movement related to interactive devices 102 and knowledge corpus of movements of interactive devices 102.

Li-Fi management component 111 can include the following subcomponents, environment component 121, Li-Fi devices component 122, analysis component 123 and output component 124.

As is further described herein below, environment component 121 of the present invention provides the capability of analyzing the area where Li-Fi devices (e.g., 103, 104) are located along with interactive device 102. For example, in an industrial setting, where there is ae production assembly area that requires the use of light-based communication (e.g., 103, 104) between robotic devices (i.e., 102). Environmental component 121 can identify and observe (via IoT device 105) the locations of all objects within the production assembly area. The observations/characteristics will be saved as a historical dataset for analyzing at later time or could be use in real-time troubleshooting/monitoring.

In another example, such as in a home entertainment environment, environmental component 121 may identify objects in the house, including users (i.e., players) utilizing interactive devices 102 (i.e., wearing AR/VR headset and video game controller). Furthermore, environmental component 121 may observe the movement of the users while using the interactive devices 102 and identify objects (e.g., lamp, table, etc.) that may potential interfere with the Li-Fi signal while users are enjoying their AR/VR game. It is noted that obstacles may include the movement of the users (i.e., arm) themselves blocking the light path.

As is further described herein below, Li-Fi devices component 122 of the present invention provides the capability of managing network instructions (e.g., routing, re-routing, stop/start transmitting, stop/start receiving, etc.) for Li-Fi devices within the observable area or that have been identified by environmental component.

It is noted that Li-Fi devices component 122 is capable of instructing secondary Li-Fi devices 104, such as motorized mirror assemblies to rotate/orient a certain direction based on the movement of interactive devices 102 (i.e., robotic arms) that can interrupt the light path of Li-Fi network.

As is further described herein below, analysis component 123 of the present invention provides the capability of performing simulations by interactive device 102 where the scenarios from the simulation can yield the following result, but it is not limited to, i) simulate client device movement where it does not block/interrupt existing Li-Fi network, ii) simulate client device where all client device are synchronized such that all the movements performed by the client device(s) do not interfere with existing Li-Fi network, iii) simulate movement of the client device in order to identify shadows/obstacles in existing Li-Fi network and iv) simulate Li-Fi devices (i.e., secondary devices such as mirror assembly) to form new light path between primary and/or secondary devices in order to keep the light-based communication uninterrupted.

Regarding function (i), "simulating client device movement", a scenario will be described below. For example, a scenario in an industrial automation environment where robotic arms are performing assembly work (e.g., putting parts together, welding parts, etc.), the movement of the arms or any articulating mechanical appendages (i.e., used to perform a task) will block and/or interrupt the existing Li-Fi network in that location (where the robotic arms are situated) for one robotic station. Analysis component 123 can perform a simulation (via machine learning) to determine one or more different 3D paths of the robotic arm where it does not block the Li-Fi network and the allows the robotic arms to complete its routine task.

In another embodiment, analysis component 123 may identify secondary client device 104 (motorized mirror assembly) that are located on the robotic arm and may perform simulations where those motorized mirror assembly (array of mirror or just one) are able to reflect/bend the beam around the robotic arm as the robotic arm continues to performs the task without blocking the Li-Fi network.

Regarding function (ii), "simulate client device where all client devices are synchronized . . . ", a scenario will be described below. For example, a scenario where there are multiple robotic arms at multiple robotic stations, their routine movement would temporarily block a Li-Fi network (that is situated along the multiple stations, see FIG. 2B). Analysis component 123 can determine (via simulation) whether it is possible to coordinate and/or synchronize new movements of all the robotic arms that will not block the Li-Fi network path while the new movement still allows for ability to perform their routine tasks.

Regarding function (iii), "simulate movement of the client device in order to identify shadows/obstacles . . . ", a scenario will be described below. For example, a scenario in an industrial automation environment where robotic arms are performing assembly work (e.g., putting parts together, welding parts, etc.), the movement of the arms or any articulating mechanical appendages (i.e., used to perform a task) can create shadows that might interfere with the existing Li-Fi network in that location. Analysis component 123 can perform a simulation (via machine learning) to determine the locations of shadows based on the movement of the robotic arm as it perform its routine task. The locations of the shadows can be used by engineers to strategic place secondary Li-Fi devices around/on the robotic arms or completely redesigned new paths for the primary Li-Fi devices.

Other embodiments of analysis component 123 can include utilize existing secondary Li-Fi devices on robotic arms or autonomous guided vehicle as a backup path should the primary Li-FI devices become inoperable (e.g., block network path or hardware failure). Thus, no disruption would occur where the hand off to the secondary Li-Fi devices on the robotic assembly is a seamless transition.

As is further described herein below, output component 124 of the present invention provides the capability of managing i) interactive devices 102 and ii) primary and secondary Li-Fi devices (e.g., 103, 104) and creating recommendation reports to users based on results from analysis component 123.

Regarding (i) managing interactive devices 102, this is in reference to where the interactive devices 102 are robotic assembly or electro-mechanic devices that are capable of receiving programming instructions. Thus, output component 124, is capable of functions such as, but not limited to, i) instructing the robotic assembly to perform new or revised movements based on the recommendation of analysis component 123 and ii) instructing a group of robotic assembly to perform synchronized movements based on the recommendation of analysis component 123.

In regard to (ii) managing primary and secondary Li-Fi devices, this would include functions such as, but it is not limited to, i) instructing secondary Li-Fi devices (e.g., assembly mirrors) to rotate/orient in a certain direction to help reflect the existing light beam in a new and uninterrupted path and ii) instruction primary Li-Fi devices to re-route data to secondary Li-Fi devices should the main/primary path of the primary Li-Fi device encounter an obstacle (blocked path). It is noted that secondary Li-Fi devices does not have to reside on robotic assembly or other moving objects, it can be stationary.

Figure 2A:
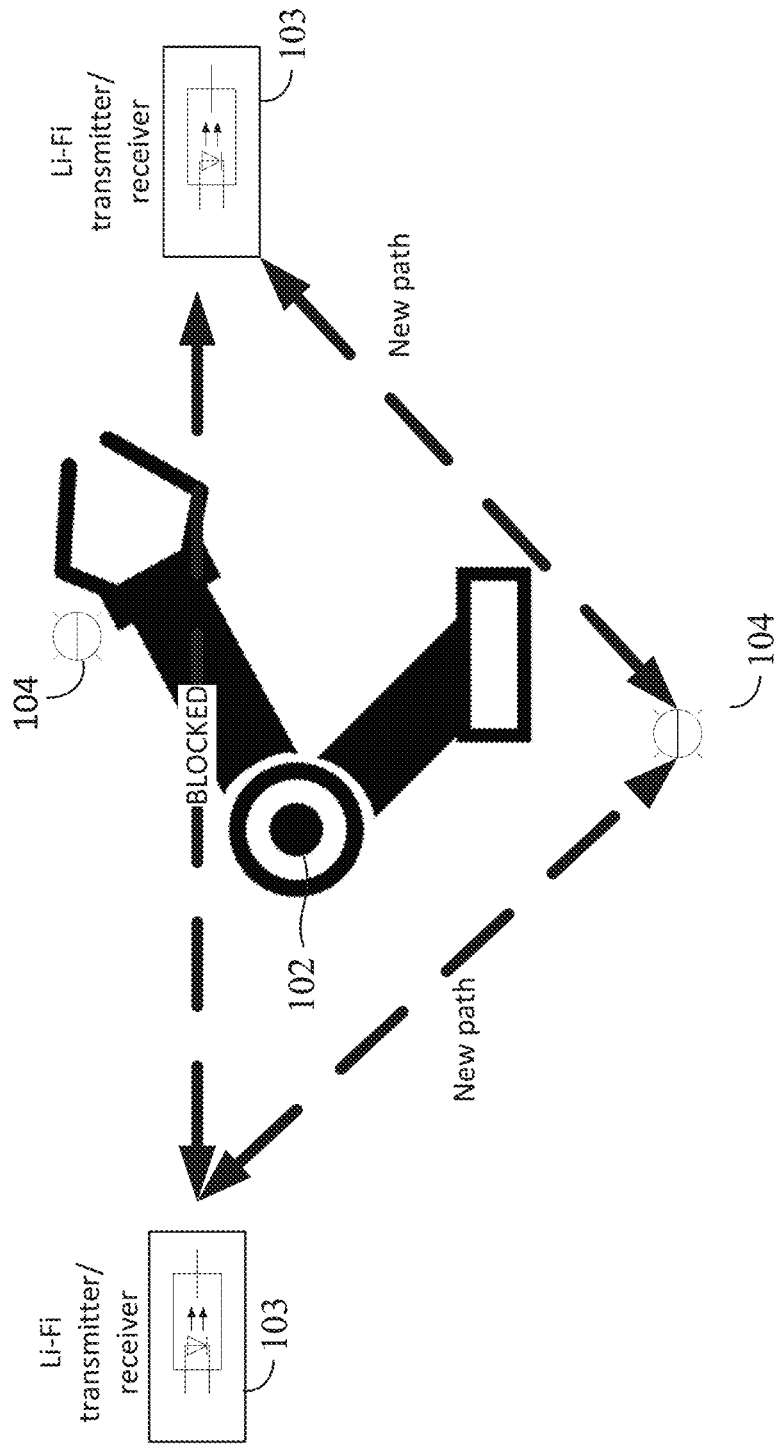
FIG. 2A is a functional block diagraming illustrating interactive device 102 intermingling with Li-Fi devices (e.g., 103, 104) while performing routine task including the one or more light path (dotted lines) associated with the Li-Fi devices (e.g., 103, 104), in accordance with an embodiment of the present invention.

FIG. 2A is a functional block diagraming illustrating interactive device 102 intermingling with Li-Fi devices (e.g., 103, 104) while performing routine task and one or more light path associated with the Li-Fi devices (e.g., 103, 104).

Figure 2B:
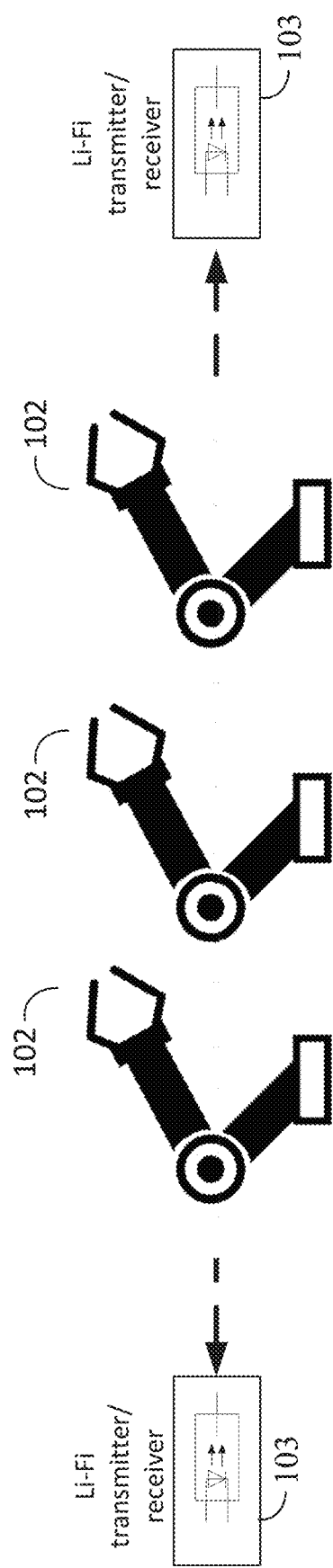
FIG. 2B is a functional block diagraming illustrating multiple interactive device 102 intermingling with Li-Fi devices while performing routine task but with synchronized movement as not to disrupt the light beam path between Li-Fi devices (i.e., 103), in accordance with an embodiment of the present invention.

FIG. 2B is a functional block diagraming illustrating multiple interactive device 102 intermingling with Li-Fi devices while performing routine task but with synchronized movement as not to disrupt the light beam path between Li-Fi devices (i.e., 103).

Figure 3A:
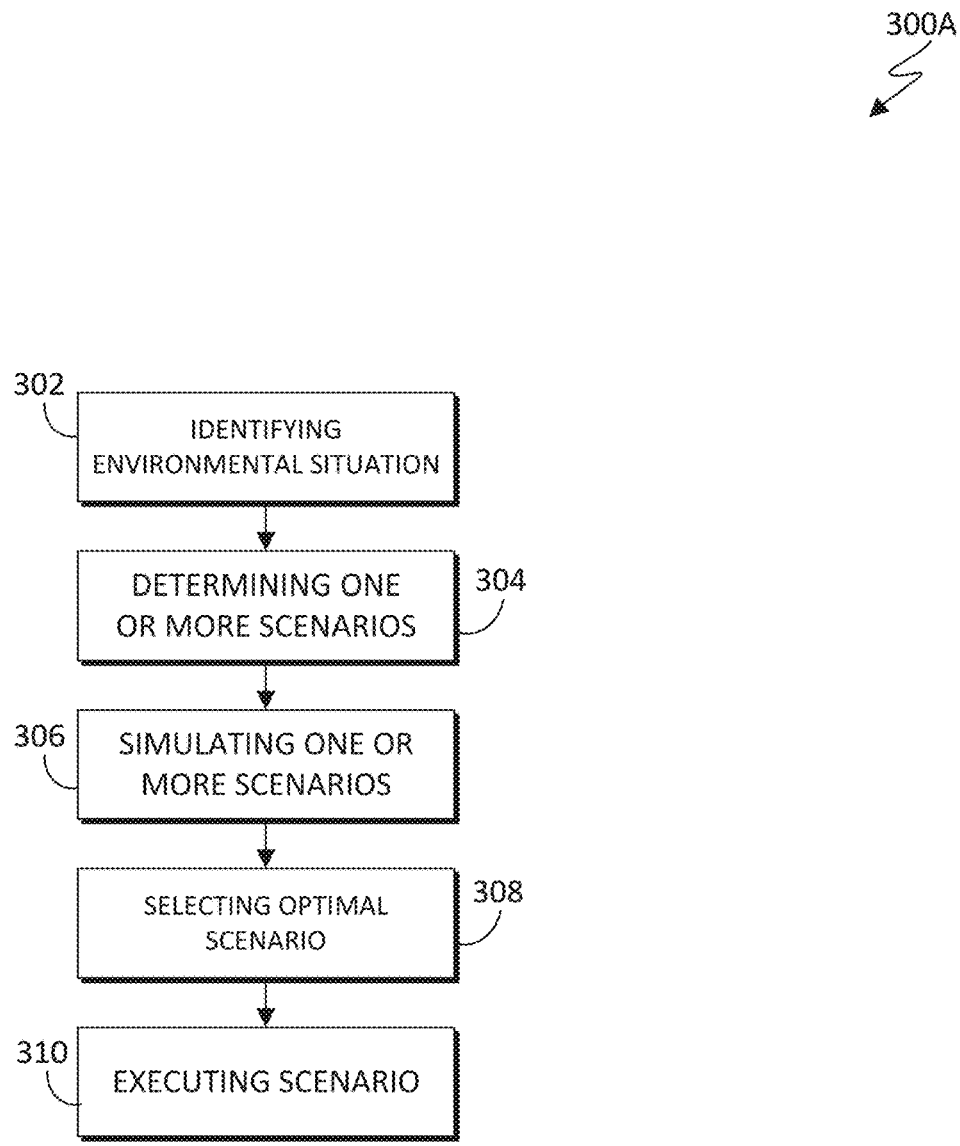
FIG. 3A is a high-level flowchart illustrating the Li-Fi management component 111, designated as 300A, in accordance with another embodiment of the present invention.
Figure 3B:
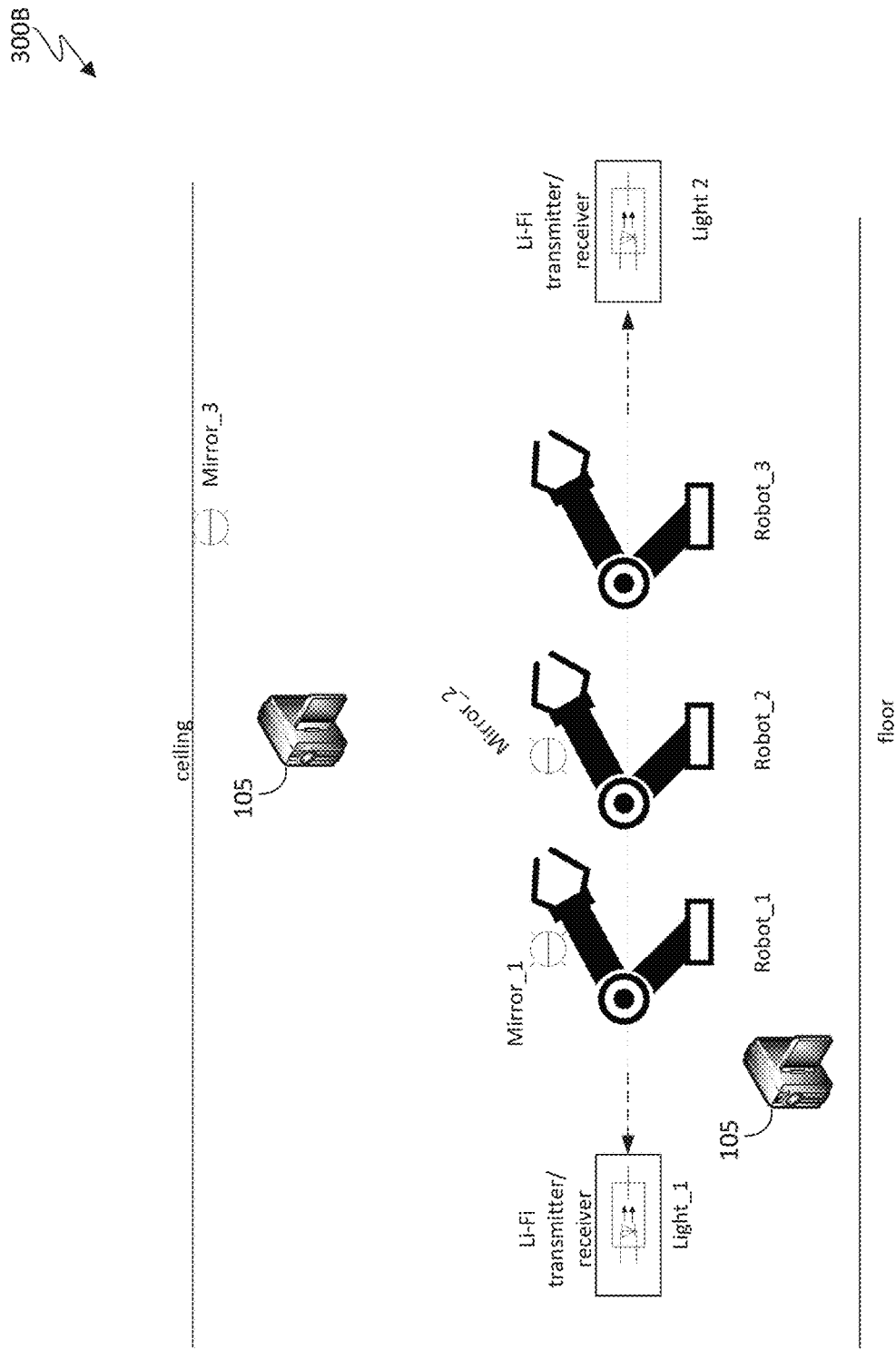
FIG. 3B is an accompanying use case scenario to the high-level flowchart (FIG. 3A) in order to help illustrate the steps of Li-Fi management component 111, designated as 300B, in accordance with another embodiment of the present invention.

FIG. 3A is a high-level flowchart illustrating the Li-Fi management component 111, designated as 300A, in accordance with an embodiment of the present invention. A use case scenario will be presented and the steps of the flowchart will be used to help explain Li-Fi management component 111. One example, a use case scenario involves multiple robotic assembly stations (e.g., robot_1, robot_2, robot_3, etc.) in an industrial automation environment will be utilized (see FIG. 3B). There is a certain area of that particular environment where items are assembled and/or produced that requires little to zero radio frequency radiation, which may interfere with the items and/or processes. Thus, a light-based communication system LAN (local area network) is installed for that particular area which can be coupled to a larger WAN (wide area network). The LAN network comprises of various Li-Fi transmitter and receivers (e.g., light_1 and light_2). Furthermore, there are flexible mirror assemblies located on multiple robotic assembly stations (e.g., mirror_1, mirror_2 and mirror_3). Mirror_1 is located along the robotic arm of robot_1. Mirror_2 is located along the body/arm of robot_2. However, mirror_3 is located on the ceiling directly above robot_3. There are IoT devices 105 located throughout the area to observe and monitor the area. It is noted that during idle (or power down state of equipment), robot_1, robot_2 and robot_3 does not block the light beam/path between light_1 and light_2.

Li-Fi management component 111 identifies environmental situation (step 302). In an embodiment, Li-Fi management component 111, through environment component 121, identifies and observes all objects (e.g., stationary, moving, etc.) and devices (via IoT device 105) in an area that utilizes light-based communication network. For example, referring to the use case scenario (see FIG. 3B), Li-Fi management component 111, through environment component 121, observes movements of robotic assembly stations (e.g., robot_1-3) and saves their movement in a database to be used later for analysis. Li-Fi management component 111 can also identify the primary path of light-based communication between light_1 and light_2 and location of all secondary Li-Fi devices (i.e., mirror assemblies).

Li-Fi management component 111 identifies one or more obstacles (step 304). In an embodiment, Li-Fi management component 111, through environment component 121 identifies one or more obstacles between primary Li-Fi devices. For example, referring to the use case scenario (see FIG. 3B), the assembly robots (e.g., robot_1, robot_2 and robot_3) become obstacles to the light path between light_1 and light_2 while the assembly robots are in operation (i.e., performing routine/daily tasks as per instructed). It is noted that during idle (or power down state of equipment), robot_1, robot_2 and robot_3 does not block the light beam/path between light_1 and light_2.

Li-Fi management component 111 simulating one or more scenarios based on the one or more obstacles (step 306). In an embodiment, Li-Fi management component 111, through analysis component 123, initiates several simulations to determine, i) blockage to the Li-Fi signal path by the movement of client devices during normal operation of client devices (i.e., not at idle), ii) shadow areas which can interrupt light path/signal created by movement of the client devices and iii) how to move client device (or for multiple devices, determine synchronize movement for devices) in a manner that does not block the light path but is able to perform the routine/daily functions and tasks. It is noted that the source data to be used for simulations came come from database 116, where environmental component 121 has stored historical observations and/or real time observations for the environment (e.g., path of Li-Fi network, location of Li-Fi devices, location of client devices, location of walls, structures, etc.). For example, referring to the use case scenario (see FIG. 3B), Li-Fi management component 111, through analysis component 123, perform simulations of robot_1, robot_2 and robot_3, where all of robotic assembly are performing its task and goals, to determine, whether any or all movements of devices will interfere/block the light path between light_1 and light_2. Simulations can include scenarios where all robotic assembly devices are able to perform their tasks without interfering with the existing light path (i.e., light_1 and light_2).

Also, simulations can include scenarios where robotic assembly are not able to perform their task but is able to utilize secondary Li-Fi devices (e.g., mirror_1, mirror_2 or mirror_3) to reflect or create a new light path from light_1 to light_2. For example, a new path can be created (referring to FIG. 3B) from light_1 (around robot_1) by bouncing off mirror_1 to mirror_2 and to mirror_3 (i.e., movement of robot_3 doesn't allow any flexibility to the light path and must be bypassed fully) and finally to light_2. Other scenarios based on the simulation can include, but it is not limited to combinations of new light paths, light_1→mirror_1→light_2, light_1→mirror_3→light_2 and light_1→mirror_1→mirror_2→light_2.

In another embodiment, (referring to the use case scenario (FIG. 3B)), Li-Fi management component 111, through analysis component 123, can also predict shadow areas on robot_1, robot_2 and robot_3 where engineers can install secondary Li-Fi devices in strategic location (e.g., mirror_1, mirror_2 and mirror_3) that is not blocked by the robotic movements.

Li-Fi management component 111 selects an optimal scenario (step 308). In an embodiment, Li-Fi management component 111 selects a scenario from the one or more scenarios with an optimal communication pathway between the primary Li-Fi devices. The optimal scenario can include utilizing secondary Li-Fi devices as well (see previous step).

For example, referring to the use case scenario (see FIG. 3B), Li-Fi management component 111 selects a scenario where only mirror_1 is needed to create a new uninterrupted path between light_1 and light_2 (i.e., movements from robot_2 and robot_3 are not blocking the path. However, mirror_1 must be continuously rotate to keep the beam from light_1 to light_2 from being interrupted while the arm of robot_1 moves to perform its daily task. Thus, Li-Fi management component 111, through Li-Fi devices component 122, must instruct mirror_1 to actively rotate in manner that keeps the light beam intact. This instruction will be used in the next step.

Li-Fi management component 111 executing the scenario (step 310). In an embodiment, Li-Fi management component 111 can perform the scenario if there instructions associated with the selected scenario. For example, referring to the use case scenario (see FIG. 3B), Li-Fi management component 111 selects a scenario where only mirror_1 is required. Li-Fi management component 111, through Li-Fi device component 122, can instruct mirror_1 to actively rotate to keep the beam path from light_1 to light_2 intact and instruct robot_1, robot_2 and robot_3 to move a certain manner to keep the same beam intact while performing its daily task.

However, some of the results of the scenarios do not involve executing instructions, such as outputting a reporting for the users. A report of obstacles and/or shadows can be generated for the users (engineers) to determine a location to install secondary Li-Fi devices or plan a new path for primary Li-Fi device where there is optimal coverage for all robotic assembly devices.

Another use case scenario may involve users of client devices in an entertainment gaming environment. For example, users may wear AR/VR goggles that utilizes Li-Fi network in a gaming situation instead of using Wi-Fi due to possible radio frequency interference. Li-Fi management component 111 may observe movements of users while wearing AR/VR goggles and perform simulation scenarios (determine any obstacles to the light path). The result of the scenarios would include scenarios with the optimal (i.e., no interruption to the light path) communication between AR/VR goggles and the primary Li-Fi device. Li-Fi management component 111 would select the optimal scenario and execute actions related to the scenario. For example, the scenario could instruct secondary Li-Fi devices to rotate in a manner to keep the light beam from the Li-Fi device to the AR/VR goggle uninterrupted from the movement of the users.

Figure 4:
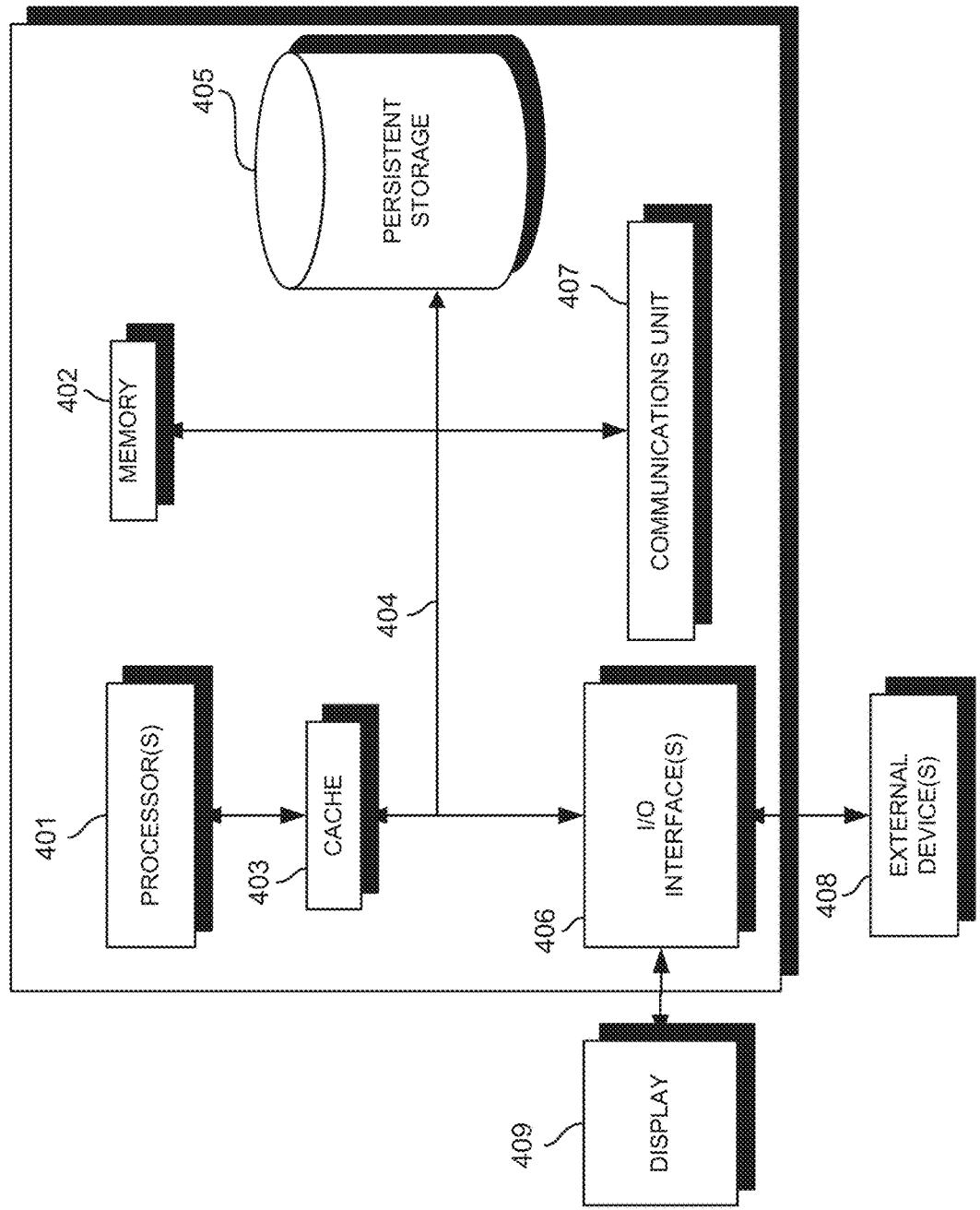
FIG. 4 depicts a block diagram, designated as 400, of components of a server computer capable of executing the Li-Fi management component 111 within the Li-Fi management environment 100, in accordance with an embodiment of the present invention.

FIG. 4, designated as 400, depicts a block diagram of components of Li-Fi management component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data× 10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Li-Fi management component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., Li-Fi management component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., Li-Fi management component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for dynamically restoring Li-Fi communication between Li-Fi devices, the computer-implemented method comprising:
   Identifying, by a machine learning algorithm, environmental situation associated with Li-Fi devices communicating to other Li-Fi device of the Li-Fi devices;
   determining, by the machine learning algorithm, one or more obstacles based on the environmental situation;
   simulating, by the machine learning algorithm, one or more scenarios based on the one or more obstacles;
   selecting, by the machine learning algorithm, a first scenario from the one or more scenarios, wherein the first scenario utilizes secondary Li-Fi devices to form a new light path with a primary Li-Fi devices of the Li-Fi devices; and
   executing the first scenario.

2. The computer-implemented method of claim 1, further comprising:
   selecting a second scenario from the one or more scenarios, wherein the one or more scenario comprises of, determining movement of one or more client devices does not block a light path between the Li-Fi devices, determining synchronize movement of all of the one or more client devices where the synchronized movement are synchronized such that the synchronized movement do not block the light path between the Li-Fi devices, identifying shadows caused by the movement of the one or more client devices and orienting the secondary Li-Fi devices to form a new light path between the Li-Fi devices in order to keep the light path uninterrupted; and
   executing the second scenario, wherein the second scenario is determining synchronize movement of all of the one or more client devices where the synchronized movement are synchronized such that the synchronized movement do not block the light path between the Li-Fi devices.

3. The computer-implemented method of claim 1, wherein the environmental situation comprises of locations of Li-Fi devices, structures, location of one or more client devices, movements of the one or more client devices and light path between the Li-Fi devices.

4. The computer-implemented method of claim 1, wherein the one or more obstacles comprises of blockage of the light path between the Li-Fi devices.

5. The computer-implemented method of claim 1, wherein simulating the one or more scenarios further comprises:
   retrieving a first data associated with the environmental situation, a second data associated with the one or more obstacles, wherein the first and second data comprises of historical and live data; and
   performing simulations, via machine learning, based on the first data and the second data, wherein result of the simulations consists of the one or more scenarios.

6. The computer-implemented method of claim 1, wherein the Li-Fi devices are entertainment devices.

7. The computer-implemented method of claim 1, wherein executing the first scenario further comprises of instructing the secondary Li-Fi devices to orient towards the primary Li-Fi devices while the Li-Fi devices are moving.

8. A computer program product for dynamically restoring Li-Fi communication between Li-Fi devices, the computer program product comprising:
   one or more computer readable storage media and program instructions stored on the one or more computer readable storage media, the program instructions comprising:
      program instructions to identify, by a machine learning algorithm, environmental situation associated with Li-Fi devices communicating to other Li-Fi device of the Li-Fi devices;
      program instructions to determine, by the machine learning algorithm, one or more obstacles based on the environmental situation;
      program instructions to simulate, by the machine learning algorithm, one or more scenarios based on the one or more obstacles;
      program instructions to select, by the machine learning algorithm, first scenario from the one or more scenarios, wherein the first scenario utilizes secondary Li-Fi devices to form a new light path with a primary Li-Fi devices of the Li-Fi devices; and
      program instructions to execute, by the machine learning algorithm, the first scenario.

9. The computer program product of claim 8, further comprising:
   program instructions to select a second scenario from the one or more scenarios, wherein the one or more scenario comprises of, program instructions to determine movement of one or more client devices does not block a light path between the Li-Fi devices, program instructions to determine synchronize movement of all of the one or more client devices where the synchronized movement are synchronized such that the synchronized movement do not block the light path between the Li-Fi devices, program instructions to identify shadows caused by the movement of the one or more client devices and program instructions to orient secondary Li-Fi devices to form a new light path between the Li-Fi devices in order to keep the light path uninterrupted; and
   program instructions to execute the second scenario, wherein the second scenario is program instructions to determine synchronize movement of all the one or more client devices where the synchronized movement are synchronized such that the synchronized movement do not block the light path between the Li-Fi devices.

10. The computer program product of claim 8, wherein the environmental situation comprises of locations of Li-Fi devices, structures, location of one or more client devices, movements of the one or more client devices and light path between the Li-Fi devices.

11. The computer program product of claim 8, wherein the one or more obstacles comprises of blockage of the light path between the Li-Fi devices.

12. The computer program product of claim 8, wherein program instructions to simulate the one or more scenarios further comprises:
   program instructions to retrieve a first data associated with the environmental situation, a second data associated with the one or more obstacles, wherein the first and second data comprises of historical and live data; and
   program instructions to perform simulations, via machine learning, based on the first data and the second data, wherein result of the simulations consists of the one or more scenarios.

13. The computer program product of claim 8, wherein the Li-Fi devices are entertainment devices.

14. The computer program product of claim 8, wherein program instructions to execute the first scenario further comprises of program instructions to instruct the secondary Li-Fi devices to orient towards the primary Li-Fi devices while the Li-Fi devices are moving.

15. A computer system for dynamically restoring Li-Fi communication between Li-Fi devices, the computer system comprising:
one or more computer processors;
one or more computer readable storage media; and
program instructions stored on the one or more computer readable storage media for execution by at least one of the one or more computer processors, the program instructions comprising:
program instructions to identify, by a machine learning algorithm, environmental situation associated with Li-Fi devices communicating to other Li-Fi device of the Li-Fi devices;
program instructions to determine, by the machine learning algorithm, one or more obstacles based on the environmental situation;
program instructions to simulate, by the machine learning algorithm, one or more scenarios based on the one or more obstacles;
program instructions to select, by the machine learning algorithm, an first scenario from the one or more scenarios, wherein the first scenario utilizes secondary Li-Fi devices to form a new light path with a primary Li-Fi devices of the Li-Fi devices; and
program instructions to execute, by the machine learning algorithm, the first scenario.

16. The computer system of claim 15, further comprising:
program instructions to select a second scenario from the one or more scenarios, wherein the one or more scenario comprises of, program instructions to determine movement of one or more client devices does not block a light path between the Li-Fi devices, program instructions to determine synchronize movement of all of the one or more client devices where the synchronized movement are synchronized such that the synchronized movement do not block the light path between the Li-Fi devices, program instructions to identify shadows caused by the movement of the one or more client devices and program instructions to orient secondary Li-Fi devices to form a new light path between the Li-Fi devices in order to keep the light path uninterrupted; and
program instructions to execute the second scenario, wherein the second scenario is program instructions to determine synchronize movement of all the one or more client devices where the synchronized movement are synchronized such that the synchronized movement do not block the light path between the Li-Fi devices.

17. The computer system of claim 15, wherein the environmental situation comprises of locations of Li-Fi devices, structures, location of one or more client devices, movements of the one or more client devices and light path between the Li-Fi devices.

18. The computer system of claim 15, wherein the one or more obstacles comprises of blockage of the light path between the Li-Fi devices.

19. The computer system of claim 15, wherein program instructions to simulate the one or more scenarios further comprises:
program instructions to retrieve a first data associated with the environmental situation, a second data associated with the one or more obstacles, wherein the first and second data comprises of historical and live data; and
program instructions to perform simulations, via machine learning, based on the first data and the second data, wherein result of the simulations consists of the one or more scenarios.

20. The computer system of claim 15, wherein the Li-Fi devices are entertainment devices.

* * * * *